(12) United States Patent
Ladonnikov

(10) Patent No.: US 7,213,167 B1
(45) Date of Patent: May 1, 2007

(54) REDUNDANT STATE MACHINES IN NETWORK ELEMENTS

(75) Inventor: Maxim Ladonnikov, Sunnyvale, CA (US)

(73) Assignee: Verso Technologies, Inc., Atlanta, GA (US)

( * ) Notice: Subject to any disclaimer, the term of this patent is extended or adjusted under 35 U.S.C. 154(b) by 0 days.

(21) Appl. No.: 09/484,356

(22) Filed: Jan. 18, 2000

(51) Int. Cl.
*H02H 3/05* (2006.01)

(52) U.S. Cl. .............................. 714/11; 714/13; 714/10; 713/1

(58) Field of Classification Search ................... 714/11, 714/12, 13, 10; 379/9.05; 713/1, 2
See application file for complete search history.

(56) References Cited

U.S. PATENT DOCUMENTS

| | | | | |
|---|---|---|---|---|
| 4,610,013 A | * | 9/1986 | Long et al. ..................... | 714/11 |
| 5,704,032 A | * | 12/1997 | Badovinatz et al. ......... | 370/245 |
| 5,784,551 A | * | 7/1998 | De Leva et al. .............. | 714/13 |
| 5,835,697 A | * | 11/1998 | Watabe et al. ................. | 714/11 |
| 5,890,003 A | * | 3/1999 | Cutts et al. ................... | 710/263 |
| 5,951,683 A | * | 9/1999 | Yuuki et al. .................. | 709/208 |
| 5,978,932 A | * | 11/1999 | Nishiyuki et al. ............. | 714/11 |
| 6,070,250 A | * | 5/2000 | Yeager et al. ................. | 714/11 |
| 6,138,247 A | * | 10/2000 | McKay et al. ................ | 714/10 |
| 6,178,445 B1 | * | 1/2001 | Dawkins et al. ............. | 709/208 |
| 6,219,801 B1 | * | 4/2001 | Yuge et al. ................... | 714/13 |

* cited by examiner

*Primary Examiner*—Robert Beausoliel
*Assistant Examiner*—Yolanda L. Wilson
(74) *Attorney, Agent, or Firm*—Carr & Ferrell LLP

(57) ABSTRACT

A mechanism for providing one or more passive state machines behaving in the same manner as an active state machine so that one of the passive machines will take over operation from the active machine if the active machine becomes inoperative. The active machine, in addition to responding to each excitation, sends the same excitation to a first passive machine, which accumulates the excitations and waits until the expiration of a first time T1 to "pseudo" respond to the excitation. That is, the first passive machine responds to excitations as does the active machine, but its responses are discarded. Similarly, the first passive machine, upon each pseudo-execution, sends the same excitation to a second passive machine, which accumulates the excitations and waits until the expiration of a second time T2 to pseudo respond to the excitation; and the second passive machine, upon each pseudo-execution, sends the same excitation to a third passive machine, which accumulates the excitations and waits until the expiration of a third time T3 to pseudo respond to the excitation, and so on.

When an active machine becomes inoperative, another mechanism replaces the active machine with a passive machine. All passive machines are in a circle and each is assigned a number that variously increases in one direction around the circle, e.g., clockwise. Each participant, a passive machine that may become an active machine, compares its number to the two numbers of the two neighbors, and if the number of that participant is smaller than both numbers of its neighbors, then that participant becomes active.

1 Claim, 3 Drawing Sheets

| Column 1 | Column 2 | Column 3 |
|---|---|---|
| t1 | e1 | none |
| t2 | e2 | none |
| t3 | e3 | none |
| t4 | e4 | none |
| t5 | e5 | e1 |
| t6 | e6 | e2 |
| t7 | e7 | e3 |
| t8 | e8 | e8 |
| t9 | e9 | e9 |
| t10 | e10 | e10 |
| t11 | e11 | e11 |
| t12 | e12 | e12 |

T1 spans t1–t4 in Column 1.

FIG. 2

REDUNDANT STATE MACHINES IN NETWORK ELEMENTS

BACKGROUND OF THE INVENTION

1. Technical Field

The present invention relates generally to networks and more particularly to supporting redundant state machines in network elements.

2. Description of the Background Art

A state machine receives excitations and in response, depending on what state the machine was in, changes to another state. State machines are useful in various applications, which may require a passive redundant machine to take over the operation of an active machine when this active machine becomes inactive, e.g., due to erroneous operations, power failures, etc. Presently, state machines are used redundantly in numerous architectures, but none of these are satisfactorily efficient for use in network elements of signaling systems, and telecommunication systems in particular. For example, a prior art solution copies the states of the active state machine to the passive state machine(s), i.e., the active machine responds to the incoming excitations, changes to a new state, and this new state is copied or transferred to the passive state machine. However, the new state must be stable before being transferred, and transferring states increases the chances of producing errors in both acquiring and transferring the states. In many cases, the data representing the transferred states must be compressed, then uncompressed. Further, responding to the excitations to change the states requires costly computing power. This cost increases significantly where many states are involved, such as in a gateway having thousands of ports, each of which must be stable and report it stabilized state before acquiring the new state. Committing, i.e., ensuring a state is transferable before transferring, reduces transferring erroneous states, but also involves another level of checking and increases costs.

Therefore, what is needed is a mechanism for supporting redundant state machines with less cost and higher efficiency.

SUMMARY OF THE INVENTION

The present invention provides one or more passive state machines behaving in the same manner as an active state machine, and ready to take over the operation of the active machine if the active machine becomes inoperative. The active machine responds to each excitation and in addition passes the same excitation to a first passive machine, which time stamps and accumulates excitations in a FIFO queue and waits until the expiration of a time T1 to "pseudo-execute" the excitations. Similarly, the first passive machine, at time of pseudo-execution, passes the same excitations to a second passive machine, which time stamps and accumulates excitations and waits until the expiration of a second time T2 to pseudo-execute the excitations. The second passive machine, at time of pseudo-execution, passes the same excitation to a third passive machine, which time stamps and accumulates excitations and waits until the expiration of a third time T3 to pseudo-execute the excitations, and so on.

The invention, in another aspect, provides a method for a passive state machine to self-activate when no active state machine is operative, or to self-replace the active state machine when the active machine becomes inoperative. The passive machines are connected in a circle and each is assigned a number that, using a machine as a reference, variously increases in one direction, e.g., clockwise, around the circle. Each participating passive machine compares its number to the respective numbers of the two participating neighbors, and if the number of that participant is smaller than the numbers of both its participating neighbors, then that participant becomes active.

BRIEF DESCRIPTION OF THE DRAWINGS

FIG. 2 shows the excitations of an active and a passive machine, in accordance with the invention.

DETAIL DESCRIPTION OF THE PREFERRED EMBODIMENT

The present invention is directed to a mechanism for providing one or more passive state machines behaving in the same manner as an active state machine so that one passive machine will take over the operation from the active machine if the active machine becomes inoperative. Even though the preferred embodiment implements the invention in telephone network elements including, for example, switching equipment, gateways, command centers, etc., the invention is useful in any group of redundant state machines, particularly in signaling systems, telecommunications, and other arts in which a second machine can automatically assume the operation of a first machine without regards to the loss of some data, e.g., due to the failure of the first machine. The invention is also useful in any computer whose functionality is duplicated for redundant purposes.

Figure 1:
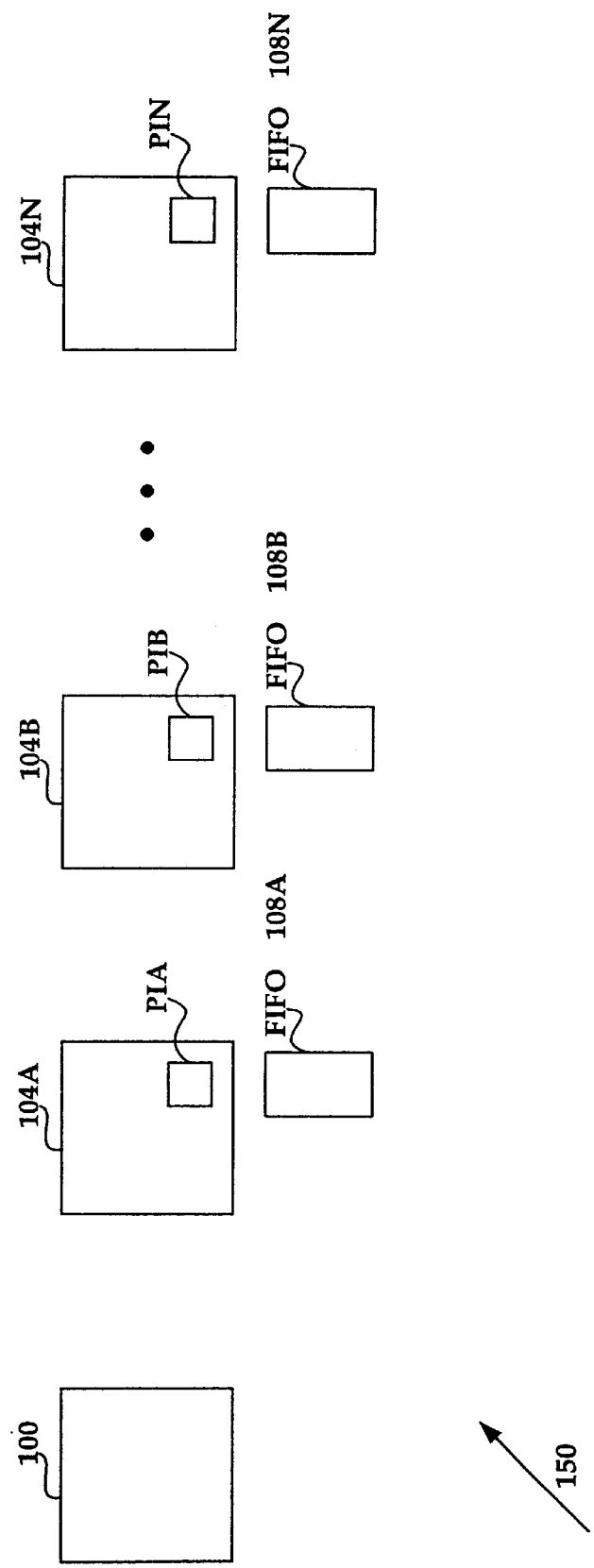
FIG. 1 shows a redundant system including one active state machine and a plurality of passive state machines.

FIG. 1 shows a redundant system 150 in accordance with the invention, including an "Active" state machine 100 and one or more redundant "Passive" state machines, e.g., 104A to 104N. Each Passive machine 104 is the same as the Active machine 100, imitates the behaviors of Active machine 100, and includes a respective intelligence PI to process the behaviors of the corresponding Passive machine 104. Intelligence PI is preferably a software module and includes, for example, a "heart beat" signal between the Active machine 100 and the Passive machine(s) 104 to determine whether the Active machine 100 has been rendered inactive. Each first-in first-out (FIFO) memory 108 stores excitations for a respective Passive machine 104.

When the Active machine 100 becomes inoperative, e.g., due to a crash, a power down, etc., the Passive machine(s) 104, via intelligence(s) PI, fail(s) to receive the "heart beat" signals and thus a Passive machine, e.g., 104A takes over the operation of the Active machine 100. This Specification discusses one Active machine 100 and one Passive machine 104A to illustrate the invention. However, the invention is applicable in a plurality of Passive machines 104 in which the first Passive machine 104A lags the Active machine 100, the second Passive machine 104B lags the first Passive machine 104A, and the third Passive machine 104C (not shown) lags the second Passive machine 104B, etc. When the Active machine 100 becomes inoperative, the first Passive machine 104A becomes the Active machine 100, the second Passive machine 104B becomes the first Passive machine 104A, etc.

In accordance with the invention, the Active machine 100, in addition to responding to an excitation, copies the same excitation to a first Passive machine, e.g., 104A to be "pseudo" executed after a first time T1 with respect to the time at which the Active machine 100 executed the excitation. For example, if the active machine is a telephone call manager of a telephone system gateway, an excitation received by the Active machine 100 is automatically transferred to another socket for the Passive machine, e.g., 104A. During the time T1, the Active machine 100 receives and responds to one or more excitations; the Passive machine 104A, on the other hand, just accumulates the excitations from the Active machine 100 and stores these excitations in FIFO 108, without responding to them. The Passive machine 104A thus lags the Active machine 100 a time T1 in responding to the excitations. Similarly, the first Passive machine 104A, upon pseudo-executing an excitation from respective FIFO 108A, copies the same excitation to a second Passive machine 104B to be "pseudo" executed after a second time T2 interval. The second Passive machine 104B copies the same excitation to the third Passive machine 104C to be "pseudo" executed after a third time T3, etc. "Pseudo" execution means that the Passive machines 104 respond to an excitation, but respective intelligence PI of the Passive machine 104 is aware that the machine 104 is not active, and discards its output with no effect. If the Passive machine 104 "sends" a message to another machine, the message is ignored, but the Passive machine 104 continues on as if the message had been sent, this is known as "pseudo responding." If the Active machine 100 receives a response from a message that the Active machine 100 sent earlier, then the response is mirrored to the Passive machine(s) 104, which acts as if it/they received the response from the message it/they sent. Thus the network elements that interact with redundant system 150 are not confused by multiple messages from Passive machines 104.

The delay times, T1, T2 and T3, etc., can vary and are determined by a system designer who takes account of various factors, such as the loss of data between redundant system 150 to other network elements. According to the invention, the longer the time T, the lower the probability for system 150 to crash due to erroneous excitations and/or incorrect responses, but the bigger the amount of data that may be lost and the longer the time to recover. In the preferred embodiment, the times T1, T2, and T3 are equal.

When the Active machine 100 becomes inoperative, a Passive machine, e.g., 104A turns active, flushes its queue of excitations in FIFO 108A, and, responds to the excitation that would be received by the Active machine 100 had the Active machine 100 remained operative. This Passive machine 104A thus "falls back" by time T1, i.e., proceeds from a state the Active machine 100 was in at time T1 earlier. This is possible in accordance with the invention because in many cases, especially in telecommunications, losing small amounts of excitations can be handled. The Passive machine 104A, now active, disregards the excitations that occurred during time T1 and that would subsequently be pseudo-executed by the Passive machine 104A had the Active machine 100 continued operating. As discussed above, intelligence PIA is responsible for instructing the Passive machine 104A to take over and continue the operation of the Active machine 100 even though the Passive machine 104A is a time T1 behind the Active machine 100. Because the Passive machine 104A becomes the Active machine 100, this new Active machine 100 can in turn apply the invention to the next Passive machine, e.g., 104B.

The invention, by delaying a set of excitations instead of duplicating machine states as in the prior art, is advantageous because transferring the same set of excitations from the Active machine 100 to the Passive machine 104A is much simpler, costs less, and does not limit the number of the Passive machines 104 that can be allowed in system 150. The invention potentially allows an infinite number of Passive machines 104 because the Active machine 100 operates the same way regardless of the number of Passive machines 104, as none of them affects the Active machine 100. Further, where the Active machine 100 fails because of an erroneous excitation, that excitation, due to the time lag, can be eliminated, and thus is not repeated by the Passive machine 104A when it takes over as the new Active machine 100.

FIG. 2 illustrates the invention operating in an Active machine 100 and a Passive machine 104A, and, for illustration purpose, the Active machine 100 becomes inoperative at time t8. Column 1 shows that both machines are running from time t1 to time t12. Column 2 is associated with the Active machine 100 while column 3 is associated with the Passive machine 104A. The Passive machine 104A lags behind the Active machine 100 by a time T1, which is constituted, for example, by times t1+t2+t3+t4. In this FIG. 2 illustration, one time "t" corresponds to one excitation "e." However, in accordance with the invention, each time "t" may correspond to a plurality of excitations "e."

Column 2 shows that at times t1 to t12 the Active machine 100 receives and executes excitations e1 to e12, respectively. Column 3 shows that at times t1 to t4 the Passive machine 104A does not execute any excitation. This is because the Passive machine 104A lags the Active machine 100 by a time T1. Further, at times t5–t7 the Passive machine 104A executes excitations e1–e3, respectively, and, at time t8 the Passive machine 104A receives and later execute excitation e8, which is the excitation that the Active machine 100 would have received if it had remained active. According to the invention, the Passive machine 104A, upon becoming active at time t8, preferably discards excitations e4–e7, but responds to excitation e8. From times t9–t12, the Passive machine 104A, now active, responds to the excitations, e.g., e9–e12, that would have been received by the Active machine 100, now inoperative.

The invention, in another aspect, provides a method for selecting a Passive machine 104 to replace the Active machine 100 when the Active machine 100 becomes inoperative or no machine is active (upon system start up). All Passive machines 104 are "linked" in a circle and each is assigned a number that variously increases in one direction, e.g., clockwise, with respect to using one machine as a reference. Those machines that may become active are referred to as "Participants," while those that may not become active are referred to as "Non-participants." Each Participant, at the time to determine whether it should become active, compares its own number to those of its two neighboring Participants ("neighbors"), one on the left and one on the right. If the assigned number of that Participant is smaller than the numbers of both neighbors, then that Participant becomes active, i.e., an Active machine. In this embodiment the invention is advantageous over prior art solutions because the invention does not require a central intelligence to determine which Participant becomes active. After comparing its number to those of the two neighbors, and if it finds that the active condition is satisfied, the Participant automatically becomes the Active machine. In an alternative embodiment, the invention selects the Participant having the smallest assigned number as the Active machine 100.

Figure 3:
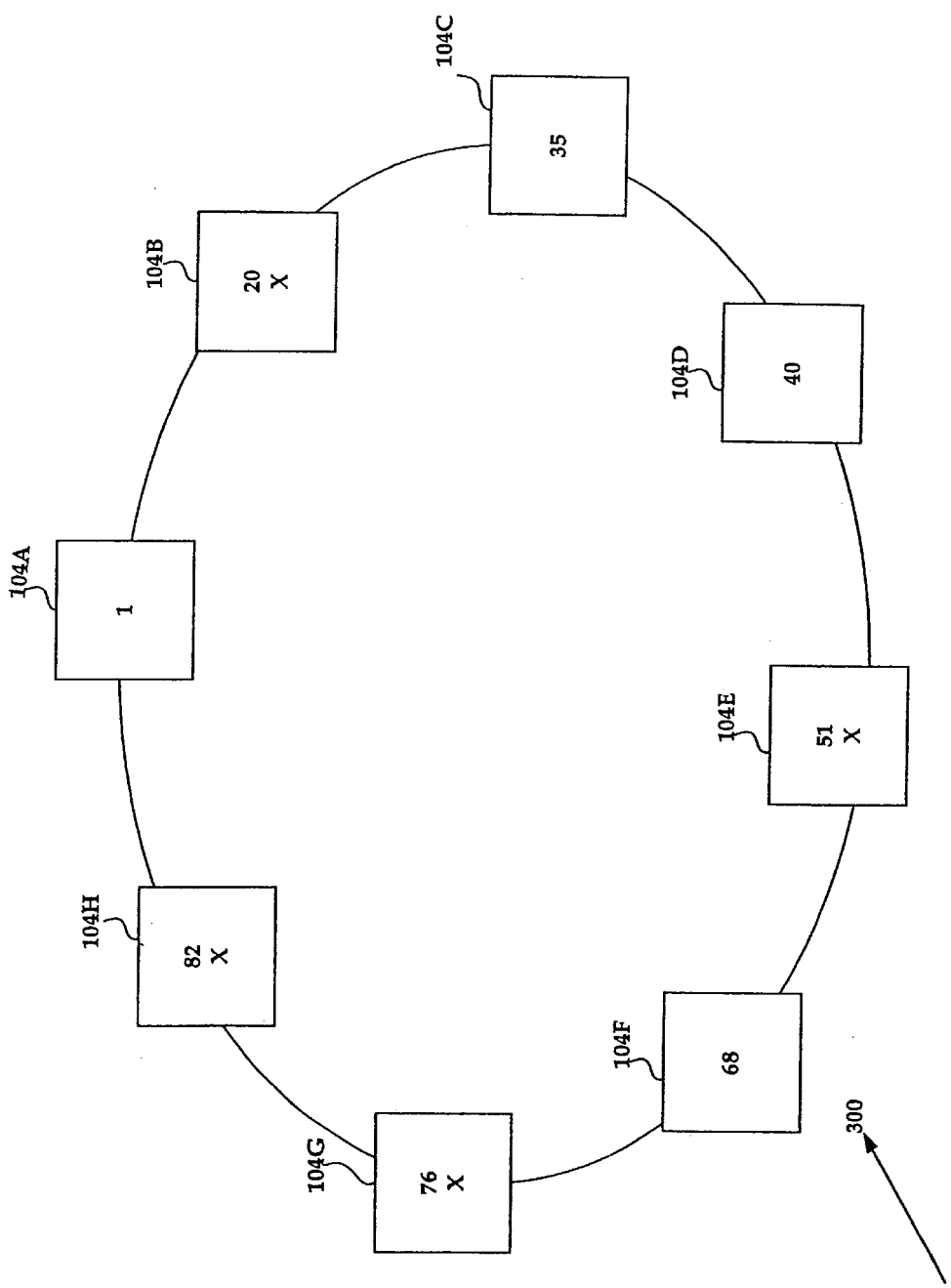
FIG. 3 shows a plurality of passive machines connected in a circle to illustrate the second aspect of the invention.

FIG. 3 shows a circle 300 comprising exemplary Passive machines 104A, 104B, 104C, 104D, 104E, 104F, 104G, and 104H being assigned corresponding numbers, e.g., 1, 20, 35, 40, 51, 68, 76, and 82, respectively. Machines 104B, 104E, 104F, 104G, and 104H are marked "X," and are thus "Participants." Machines 104A, 104C, 104D, and 104F are "Non-participants."

Machine 104B has number 20 and its two neighbors' numbers are 51 and 82. Machine 104E has number 51 and its two neighbors' numbers are 20 and 68. Machine 104G has number 76 and its two neighbors' numbers are 51 and 82. Machine 104H has number 82 and its two neighbors' numbers are 76 and 20. Because the number 20 of machine 104B is smaller its two neighbors' numbers, i.e., 51 and 82, machine 104B becomes the Active machine.

The exemplary embodiment described herein is for purposes of illustration and not intended to be limiting. Therefore, those skilled in the art will recognize that other embodiments could be practiced without departing from the scope and spirit of the claims set forth below.

What is claimed is:

1. A method for a passive machine to self-activate, comprising the steps of:

linking a plurality of passive machines in a circle;

assigning a respective number to each of said passive machines; said numbers increasing in one angular direction with respect to a reference passive machine;

identifying, as participants, those of said passive machines that may become active;

each of said participants identifying, as its neighbors, a left participant neighbor and a right participant neighbor; and comparing its number to the numbers of its neighbors; and a participant activating itself if the number of said participant is smaller than the numbers of both said participant's neighbors.

* * * * *